US012061450B2

(12) United States Patent
Zadorojniy et al.

(10) Patent No.: US 12,061,450 B2
(45) Date of Patent: Aug. 13, 2024

(54) GENERATING LOGICALLY-REPRESENTED POLICY FOR CONTROL SYSTEMS OPERATING BASED ON CONSTRAINED MARKOV DECISION PROCESS (CMDP) MODELS

(71) Applicant: International Business Machines Corporation, Armonk, NY (US)

(72) Inventors: Alexander Zadorojniy, Haifa (IL); Yishai Abraham Feldman, Tel Aviv (IL); Lan Ngoc Hoang, Lymm (GB)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 17/528,486

(22) Filed: Nov. 17, 2021

(65) Prior Publication Data

US 2023/0152766 A1    May 18, 2023

(51) Int. Cl.
*G05B 17/02* (2006.01)
*G06N 7/01* (2023.01)

(52) U.S. Cl.
CPC .............. *G05B 17/02* (2013.01); *G06N 7/01* (2023.01)

(58) Field of Classification Search
None
See application file for complete search history.

(56) References Cited

U.S. PATENT DOCUMENTS

2017/0061309 A1    3/2017   Wasserkrug et al.
2020/0356811 A1*  11/2020   Yarkony .............. G06V 40/103

OTHER PUBLICATIONS

Dolgov et al., "Symmetric Primal-Dual Approximate Linear Programming for Factored MDPs", Ninth International Symposium on Artificial Intelligence and Mathematics (ISAIM 2006), Jan. 2006, 9 pages.
Khairy et al., "A Gradient-Aware Search Algorithm for Constrained Markov Decision Processes", DeepAI, May 7, 2020, 9 pages.
(Continued)

*Primary Examiner* — Sean Shechtman
(74) *Attorney, Agent, or Firm* — Peter J. Edwards

(57) ABSTRACT

A control system, computer program product, and method for generating a logically-represented policy for a control system operating based on a CMDP model are provided. The control system directs the operation of a controlled application system that is subject to a constraint. The method includes receiving, at the control system, data corresponding to control action variables and system state variables relating to the controlled application system, data corresponding to a cost/reward, and data corresponding to the constraint, and automatically training a CMDP model for the operation of the controlled application system based on the received data, where the CMDP model is formulated using dual linear programming, and where the CMDP model includes a policy corresponding to occupation measures that are decision variables of the dual linear programming formulation. The method also includes automatically generating a logically-represented policy for the control system based on the policy of the CMDP model.

20 Claims, 5 Drawing Sheets

(56) References Cited

OTHER PUBLICATIONS

Kumar et al., "Finite Horizon Risk Sensitive MDP and Linear Programming", 54th IEEE Conference on Decision and Control (CDC), 2015 Dec. 2015, 9 pages.

Mell et al., "The NIST Definition of Cloud Computing", National Institute of Standards and Technology, U.S. Department of Commerce, Special Publication 800-145, 7 pages, Sep. 2011.

Sanner et al., "Practical solution techniques for first-order MDPs", Artificial Intelligence, Nov. 24, 2008, 41 pages.

Wang et al., "Planning with POMDPs Using a Compact, Logic-based Representation", 17th IEEE International Conference on Tools with Artificial Intelligence (ICTAI'05), Nov. 14, 2005, 8 pages.

Schlick et al., "A Symbolic Approach to Self-optimisation in Production System Analysis and Control," contained within Advances in Production Technology, specifically pp. 147-160, Springer, 2015, 212 pages.

Bonet et al., "Learning First-Order Symbolic Representations for Planning from the Structure of the State Space," iv: 1909.05546v3 [cs.AI] Feb. 20, 2020, 8 pages.

Bemporad et al., "Logic-Based Solution Methods for Optimal Control of Hybrid Systems," IEEE Transactions on Automatic Control, vol. 51, No. 6, Jun. 2006, 1 page (Abstract Only).

Toussaint, "Logic-Geometric Programming: An Optimization-Based Approach to Combined Task and Motion Planning," Proceedings of the Twenty-Fourth International Joint Conference on Artificial Intelligence (IJCAI 2015), 2015, 7 pages.

Illanes et al., "Symbolic Planning and Model-Free Reinforcement Learning: Training Taskable Agents," Printed Mar. 29, 2024, 5 pages.

Sanner et al., "Approximate Linear Programming for First-order MDPs," Printed Mar. 29, 2024, 9 pages.

Altman Inria, "Constrained Markov Decision Processes," Aug. 1998, 250 pages.

Wollenstein-Betech et al., "Explainability of Intelligent Transportation Systems using Knowledge Compilation: a Traffic Light Controller Case," Printed Mar. 29, 2024, 6 pages.

Boutilier et al., "Symbolic Dynamic Programming for First-Order MDPs," Printed Mar. 29, 2024, 8 pages.

\* cited by examiner

GENERATING LOGICALLY-REPRESENTED POLICY FOR CONTROL SYSTEMS OPERATING BASED ON CONSTRAINED MARKOV DECISION PROCESS (CMDP) MODELS

BACKGROUND

The present disclosure relates to the field of decision optimization and machine learning. More specifically, the present disclosure relates to constrained Markov decision process (CMDP) models that are used to direct the control actions taken by control systems.

SUMMARY

According to an embodiment of the present techniques, a computer-implemented method is provided for generating a logically-represented policy for a control system operating based on a constrained Markov decision process (CMDP) model. The control system directs an operation of a controlled application system that is subject to a constraint. The method includes receiving, at the control system, data corresponding to control action variables and system state variables relating to the controlled application system, data corresponding to a cost or a reward, and data corresponding to a cost of the constraint, as well as automatically training, via a processor of the control system, a CMDP model for the operation of the controlled application system based, at least in part, on the received data, where the CMDP model is formulated using dual linear programming, and where the CMDP model includes a policy corresponding to occupation measures that are decision variables of the dual linear programming formulation. The computer-implemented method also includes automatically generating, via the processor, a logically-represented policy for the control system based on the policy of the CMDP model, where the logically-represented policy is provided in a logical form.

In another embodiment of the present techniques, a control system that directs an operation of a controlled application system that is subject to a constraint is provided. The control system includes an interface for receiving data corresponding to control action variables and system state variables relating to the controlled application system, data corresponding to a cost or a reward, and data corresponding to a cost of the constraint. The control system also includes a processor and a computer-readable storage medium. The computer-readable storage medium stores program instructions that direct the processor to automatically train a CMDP model for the operation of the controlled application system based on the received data, where the CMDP model is formulated using dual linear programming, and where the CMDP model includes a policy corresponding to occupation measures that are decision variables of the dual linear programming formulation. The computer-readable storage medium also stores program instructions that direct the processor to automatically generate a logically-represented policy for the control system based on the policy of the CMDP model, where the logically-represented policy is provided in a logical form.

In another embodiment of the present techniques, a computer program product is provided for generating a logically-represented policy for a control system operating based on a CMDP model. The control system directs an operation of a controlled application system that is subject to a constraint. The computer program product includes a computer-readable storage medium having program instructions embodied therewith, where the computer-readable storage medium is not a transitory signal per se. The program instructions are executable by a processor to cause the processor to receive data corresponding to control action variables and system state variables relating to the controlled application system, data corresponding to a cost or a reward, and data corresponding to a cost of the constraint, as well as to automatically train a CMDP model for the operation of the controlled application system based, at least in part, on the received data, where the CMDP model is formulated using dual linear programming, and where the CMDP model includes a policy corresponding to occupation measures that are decision variables of the dual linear programming formulation. The program instructions are also executable by the processor to cause the processor to automatically generate a logically-represented policy for the control system based on the policy of the CMDP model, where the logically-represented policy is provided in a logical form.

DETAILED DESCRIPTION

Figure 1:
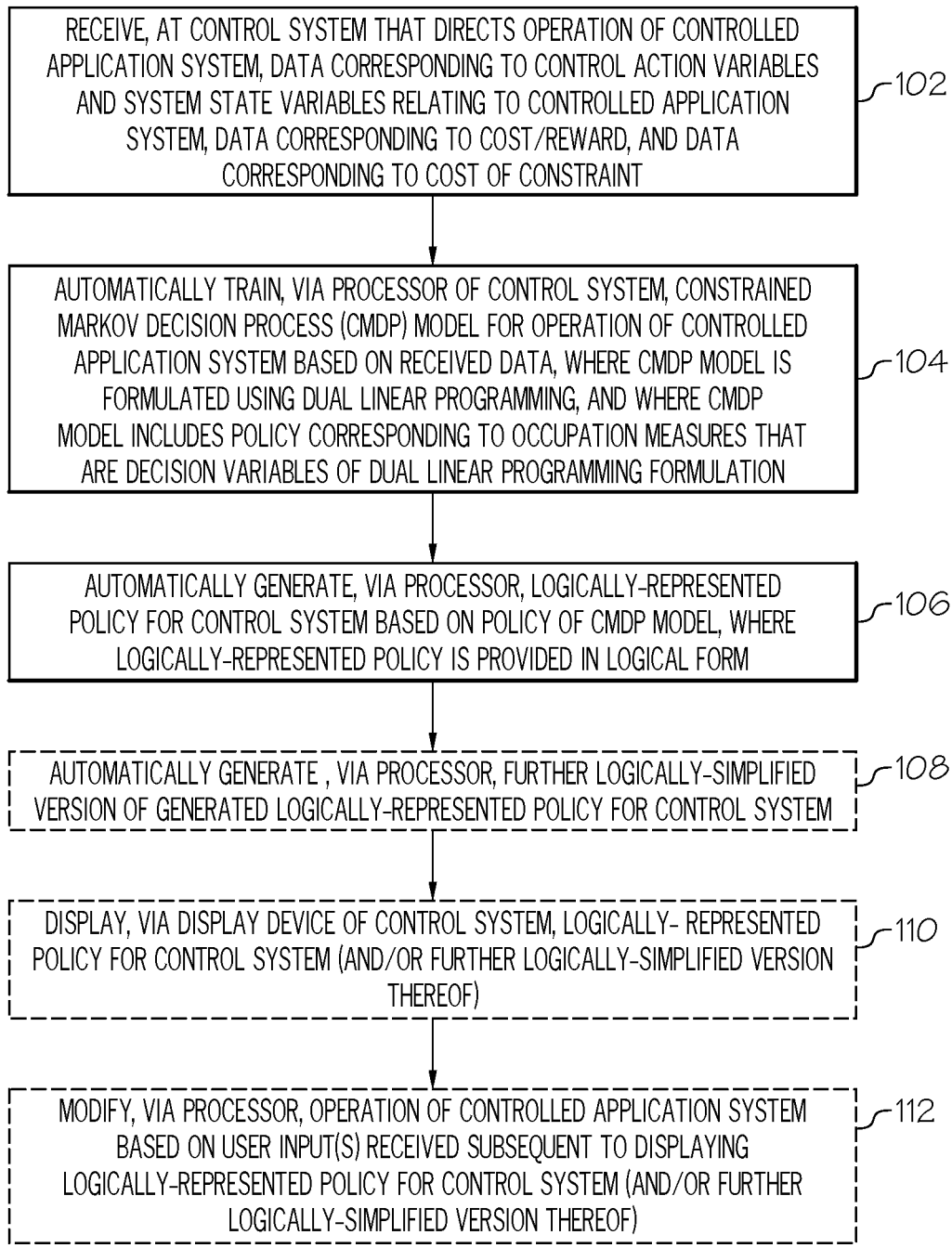
FIG. 1 is a process flow diagram of a computer-implemented method for generating a logically-represented policy for a control system operating based on a constrained Markov decision process (CMDP) model.

Machine learning techniques are commonly used for the operational optimization of control systems relating to various different types of controlled application systems. Such controlled application systems may include, for example, wastewater treatment plants, health care systems, agriculture systems, water resource management systems, queuing systems, epidemic process systems, robotic motion planning systems, inventory management systems, and/or any other types of systems that involve performing particular control actions to reach desired system states. More specifically, machine learning techniques are used to generate models that mathematically describe the operation of such controlled application systems. For example, reinforcement learning (RL) techniques may be used to learn policies that map the system state of a particular controlled application system with respect to its environment to the control actions taken by the control system relating to that controlled application system in a sequence that maximizes a notion of cumulative reward. An extension of reinforcement learning, called deep reinforcement learning (DRL), harnesses deep neural networks to model the client's/problem's environment behavior. Moreover, when a constraint is imposed on the operation of the controlled application system, constrained reinforcement learning (CRL) and/or constrained deep reinforcement learning (CDRL) techniques may be used to learn policies that take such constraints into account.

Such reinforcement learning techniques often utilize models that are based on the Markov decision process (MDP) framework, which has become the standard framework for solving decision-theoretic planning problems. In general, MDP techniques involve a complex framework for decision making that utilizes explicitly calculated/estimated probabilities of transitioning between different system states in response to particular control actions. When constrained Markov decision process (CMDP) techniques are used, the model is controlled such that particular constraints relating to the controlled application system are met.

More specifically, a CMDP is defined as a 5-tuple <S, U, P, c, $\bar{d}$>, where S is a finite set of system states (|S|=n), U is a finite set of control actions (|U|=k), P denotes a transition probability function ($X^2 \times U \rightarrow [0; 1]$), c denotes a cost function ($X \times U \rightarrow R$) that includes a vector of costs per system state/control action pair, and $\bar{d}$ denotes a vector of costs related to constraints. The finite set of system states, S, is denoted as $<s_1, s_2, \ldots s_s> \in S$, where an element from S is a vector, and the finite set of control actions, U, is denoted as $<u_1, u_2, \ldots u_u> \in U$, where an element from U is a vector. The transition probability function, P, is denoted by $P(s_j|s_i, u_k) \in [0, 1]$. Moreover, $s_t$ is a random variable that represents the system state at time t, and $u_t$ is a random variable that represents a control action at time t.

The transition probability function, P(y|x, u), quantifies the probability of transitioning from one system state, x, to another system state, y, when a control action, u, is chosen. A cost associated with selecting the control action u when in system state x equals c(x, u). Based on the different probabilities and outcomes, policies, $\pi$, are generated, where each policy induces a probability measure over the system state/control action pairs. The goal of the CMDP model is to find a policy, $\pi$, that minimizes the overall cost, C($\pi$), while ensuring the total value of the constraint, $\bar{D}$, remains below a specified value.

For a CMDP discounted cost model, the parameter $\beta \in (0, 1)$ specifies a rate by which future costs are reduced, where $p^\pi(x_t=x; u_t=u)$ denotes a probability of the event $x_t=x$ and $u_t=u$ when the initial system state equals $x_0$ and the policy is $\pi$. According to this model, the discounted occupation measure is defined as shown in Eq. (1), where (0<$\beta$<1−(discount factor)).

$$x_{s_0}^\pi(s,u)=(1-\beta)\Sigma_{t=0}^\infty \beta^t P_{s_0}^\pi(s_t=s,u_t=u) \quad (1)$$

The expectation of cost at time t with policy $\pi$ is defined as shown in Eq. (2).

$$\pi:S \rightarrow U, E_t^\pi[c(s_t,u_t)]=\Sigma_{s\in S, u\in U} c(s,u) P_{s_0}^\pi(s_t=s,u_t=u) \quad (2)$$

The cost is defined as shown in Eq. (3), where (0<$\beta$<1 (discount factor)).

$$C_{s_0}(\pi)=(1-\beta)\Sigma_{t=0}^\infty \beta^t E_t^\pi[c(s_t,u_t)]= \\ \Sigma_{(s\in S, u\in U)} c(s,u) x_{s_0}^\pi(s,u) \quad (3)$$

The constraints, $\bar{D}(\pi)$, are defined similarly, as shown in Eq. (4).

$$D_{s_0}(\pi)=(1-\beta)\Sigma_{t=0}^\infty \beta^t E_t^\pi[d(s_t,u_t)]= \\ \Sigma_{(s\in S, u\in U)} d(s,u) x_{s_0}^\pi(s,u) \quad (4)$$

As mentioned above, the goal of CMDP techniques is to find a policy, $\pi$, that minimizes the overall cost C($\pi$) while ensuring that the total value of the constraint, $\bar{D}$, remains below a specified value. The resulting policy, $\pi$, can be used for the operational optimization of the corresponding controlled application system.

In operation, the utilization of such CMDP-based policies enables control systems to automatically (or, in some cases, semi-automatically) direct the operation of controlled application systems in an efficient manner with minimal input from system operators. However, the limited interpretability of such policies creates issues for systems operators who may be unable to effectively understand and/or interact with the control system. For example, system operators may desire to understand the reasons why particular control actions were taken by control systems and/or the specific input variables that were most impactful for determining the control actions to be taken. If this information were available, it would enable system operators to perform various tasks, such as modifying the configuration of components within the controlled application systems and/or modifying the stated operational goals of the corresponding control systems, to further optimize the operation of the controlled application systems.

Despite this, transforming CMDP-based policies into a logical, interpretable form has proven to be challenging. This is due, at least in part, to the fact that controlled application systems often involve a large number of possible system states, as well as a large number of available control actions that can be taken by the respective control systems.

Therefore, embodiments described herein solve this interpretability problem by providing for the automatic generation of logically-represented policies for control systems operating based on CMDP models. In other words, embodiments described herein provide for the generation of logical, easily-interpretable representations of the CMDP-based policies that are used to direct the control actions taken by control systems. As described herein, the resulting logically-represented control system policies may then be used to modify the operation of the corresponding control systems in any suitable manner to increase the efficiency of the controlled application systems and/or to achieve results desired by the system operators.

As used herein, the term "control system" refers to any type of computing system or application that is capable of automatically (or semi-automatically) performing control actions that direct the operation of one or more controlled application systems. Moreover, the term "controlled application system" refers to any type of system that is capable of being controlled, directed, or operated based, at least in part, on control actions taken by a corresponding control system. For ease of discussion, embodiments described herein relate to the application of the present techniques to inventory management systems and wastewater treatment plants (WWTPs). However, those skilled in the art will appreciate that the techniques described herein may be similarly applied to any other suitable types of controlled application systems.

FIG. 1 is a process flow diagram of a computer-implemented method 100 for generating a logically-represented policy for a control system operating based on a CMDP model. Specifically, in various embodiments, the CMDP model is used to direct the control actions taken by the control system, and the generated logically-represented policy for the control system enables one or more operators of the control system to make one or more modifications to the control system, the controlled application system, or the interaction between the control system and the controlled application system, depending on the details of the particular implementation.

In various embodiments, the method 100 is implemented by any suitable type of computing system that is capable of acting as a control system for a controlled application system that is subject to one or more constraints. As examples, the controlled application system may be an inventory management system, a WWTP, a health care system, an agriculture system, a water resource management system, a queuing system, an epidemic process system, a robotic motion planning system, or any other suitable type of controlled application system. Moreover, the control system may be any suitable type of computing system including a processor and a computer-readable storage medium that contains program instructions for directing the processor to perform the steps of the method 100.

The method 100 begins at block 102, at which data corresponding to control action variables and system state variables relating to the controlled application system, data corresponding to a cost/reward, and data corresponding to the cost of the constraint(s) are received at the control system. As described herein, the control action variables may include a number of possible control actions that the control system can perform to control the operation of the controlled application system, and the system state variables may include a number of possible system states of the controlled application system after the control system has performed one or more control actions.

In some embodiments, at least a portion of such data are computed via sensors coupled to the controlled application system. As a non-limiting example, if the controlled application system is an inventory management system for a retail store, a portion of the data may be received from one or more sensors that are used to detect the number of inventory items that are remaining on one or more shelves within the retail store. Moreover, in some embodiments, the control system computes at least a portion of the data based on simulations of the controlled application system.

At block 104, a CMDP model for the operation of the controlled application system is automatically trained based on the data corresponding to the control action variable and the system state variables (as well as any other relevant data), where the CMDP model is formulated using dual linear programming. As described herein, training the CMDP model may include generating a policy that optimizes the control actions of the control system, given the stochastic problem relating to the relationship between the control action variables and the system state variables. Moreover, the generated policy takes into account a cost/reward function relating to the controlled application system, as well as the constraint value(s) imposed on the controlled application system.

Furthermore, the generated policy corresponds to occupation measures, where such occupation measures correspond to decision variables of the dual linear programming formulation. In particular, occupation measures are defined for each system state/control action pair, where the occupation measure for each pair is representative of the frequency, between 0 and 1, at which the pair was visited.

At block 106, a logically-represented policy for the control is automatically generated based on the policy of the CMDP model, where the logically-represented policy is provided in a logical form. Such logical form may include, for example, disjunctive normal form (DNF) and/or conjunctive normal form (CNF). Moreover, those skilled in the art will appreciate that any other suitable logical form may be alternatively utilized.

The automatic generation of the logically-represented policy for the control system may be accomplished using an automatic solver, such as, for example, a solver that utilizes the Quine-McCluskey algorithm. A specific, non-limiting example of a particular type of solver that may be utilized is the IBM CPLEX® Optimizer. Moreover, as described herein, the generated logically-represented policy for the control system may be any suitable logical, easily-interpretable representation of the CMDP-based policy that is being implemented by the control system to direct the operation of the controlled application system.

At optional block 108, a further logically-simplified version of the generated logically-represented policy for the control system is automatically generated, where the logically-simplified version is designed to be more easily interpreted by a user viewing the logically-represented policy for the control system on a display device of the control system or a remote computing device, for example. In some embodiments, the logically-simplified version of the generated logically-represented policy further increases the interpretability of the policy of the CMDP model. For example, whereas the logically-represented policy generated at block 106 may be readily interpretable by one skilled in the art, the further logically-simplified version of the policy generated at block 108 may be readily interpretable by any user who views the logically-simplified version of the policy on the display device.

At optional block 110, the logically-represented policy for the control system (and/or the further logically-simplified version thereof) is displayed via the display device of the control system (or via any suitable remote display device). The logically-represented policy for the control system (and/or the further logically-simplified version thereof) may be displayed in any suitable form(s), such as, for example, in graphical form, flowchart form, pie chart form, tabular form, and/or textual form, depending on the details of the particular implementation.

At optional block 112, the operation of the controlled application system is modified based on one or more user inputs received subsequent to the displaying of the logically-represented policy for the control system (and/or the further logically-simplified version thereof) at optional block 110. This may include, for example, modifying the configuration or operation of components within the controlled application system and/or modifying the operational goals of the control system to further optimize the operation of the controlled application system. In various embodiments, such input may be used to augment the automated control of the controlled application system as provided by the control system, thus providing valuable human oversight that can be used to improve the overall process.

The block diagram of FIG. 1 is not intended to indicate that the blocks 102-112 of the method 100 are to be executed in any particular order, or that all of the blocks 102-112 of the method 100 are to be included in every case. Moreover, any number of additional blocks may be included within the method 100, depending on the details of the specific implementation.

Turning now to an exemplary implementation of the method 100, embodiments described herein may be used by a control system corresponding to an inventory management system, where such control system is configured to order a suitable number of inventory items to meet the forecasted demand for such items. For this exemplary implementation, a "StateActionRewardModel( )" CMDP model may be used to obtain an optimal policy for managing inventory. The system state variables may be defined as state_vars=['inventory', 'demand_forecast'], and the control action variables may be defined as action_vars=['order amount']. In addition, for this embodiment, the inventory varies between 0 and 9, with 0 corresponding to the lowest inventory level and 9 corresponding to the highest inventory level. The demand forecast varies between 0 and 4, with 0 corresponding to the lowest demand forecast level and 4 corresponding to the highest demand forecast level. Therefore, there are a total of fifty system states. Furthermore, for simplicity, only two control actions are provided: order zero inventory items or order 63 inventory items. Therefore, an output of 'inventory 8 demand_forecast 0': ['order amount 0', 1.0] means that, if the inventory level is 8 and the demand forecast level is 0, then order 0 items with probability 1. In other words, for every system state, one of two control actions is recommended.

The overall goal is to generate a logically-represented policy for the control system based on the CMDP-based policy. This logically-represented policy is provided in a logical form, such as, for example, disjunctive normal form (DNF) or conjunctive normal form (CNF), and, in some embodiments, is further simplified logically to the user level such that the operator(s) are capable of easily interpreting the policy.

In various embodiments, the problem is first formulated as a dual linear programming (dual-LP) CMDP problem. The problem is then solved using a solver, such as, for example, the IBM CPLEX® Optimizer, with the occupation measure solutions being mapped to the resulting policy. The following is an exemplary portion of the resulting CMDP-based policy, where a budget constraint (not shown) for ordering inventory items is also imposed on the policy:

'inventory 8 demand_forecast 0': ['order amount 0', 1.0]
'inventory 8 demand_forecast 1': ['order amount 0', 1.0]
'inventory 8 demand_forecast 2': ['order amount 0', 1.0]
'inventory 8 demand_forecast 3': ['order amount 0', 1.0]
'inventory 9 demand_forecast 1': ['order amount 0', 1.0]
'inventory 9 demand_forecast 3': ['order amount 0', 1.0]
'inventory 9 demand_forecast 0': ['order amount 0', 1.0]
'inventory 9 demand_forecast 2': ['order amount 0', 1.0]
'inventory 0 demand_forecast 0': ['order amount 63', 1.0]
'inventory 1 demand_forecast 0': ['order amount 63', 1.0]
'inventory 1 demand_forecast 1': ['order amount 63', 1.0]
'inventory 1 demand_forecast 2': ['order amount 63', 1.0]
'inventory 2 demand_forecast 1': ['order amount 63', 1.0]
'inventory 2 demand_forecast 0': ['order amount 63', 1.0]
'inventory 3 demand_forecast 0': ['order amount 63', 1.0]
'inventory 4 demand_forecast 0': ['order amount 63', 1.0]
'inventory 5 demand_forecast 0': ['order amount 63', 1.0]
'inventory 8 demand_forecast 4': ['order amount 63', 1.0]

This CMDP-based policy is then converted to a logical form, such as DNF form, to provide the logically-represented policy for the control system. To achieve this, the following logical variables are defined: i=inventory (categorical variable$\in[0,9]$); d=demand_forecast (categorical variable$\in[0,4]$); $\neg o$=do not order any inventory items; and o=order 63 inventory items. Using these logical variables, the following logically-represented policy for the control system can be obtained:

$$((d0 \wedge i8) \vee (d0 \wedge i9) \vee (d1 \wedge i8) \vee (d1 \wedge i9) \vee (d2 \wedge i8) \vee (d2 \wedge i9) \vee (d3 \wedge i8) \vee (d3 \wedge i9)) \Rightarrow \neg o$$

$$((d0 \wedge i0) \vee (d0 \wedge i1) \vee (d0 \wedge i2) \vee (d0 \wedge i3) \vee (d0 \wedge i4) \vee (d0 \wedge i5) \vee (d1 \wedge i1) \vee (d1 \wedge i2) \vee (d2 \wedge i1) \vee (d4 \wedge i8)) \Rightarrow o$$

This logically-represented policy for the control system is a logical simplification of the complex CMDP-based policy described above. In various embodiments, the logically-represented policy for the control system is automatically generated using any suitable type of solver, such as a solver that utilizes the Quine-McCluskey algorithm. Moreover, as will be appreciated by those skilled in the art, the following is a simplified version of the logically-represented policy provided above:

Order 63 inventory items when $(o \wedge \neg i8 \wedge \neg i9)$ or $(o \wedge \neg d0 \wedge \neg d1 \wedge \neg d2 \wedge \neg d3)$ Otherwise, do not order any inventory items As will be readily appreciated, this logically-represented policy clearly provides that 63 inventory items are to be ordered when inventory is not too high (i.e., not i8 or i9) or when demand forecast is the highest (i.e., equal to $d4 = \neg d0 \wedge \neg d1 \wedge \neg d2 \wedge \neg d3$). Otherwise, no inventory items are to be ordered.

In some embodiments, it is desirable to further simplify the logically-represented policy for the control system to increase the ease with which the CMDP-based policy can be interpreted by the operator(s) or other user(s). In various embodiments, this further simplification of the logically-represented policy is also performed automatically using any suitable type of solver. As an example, the logically-represented policy provided above can be further simplified as follows:

Order and not $i==8$ and not $i==9$

Order and not $d==0$ and not $d==1$ and not $d==2$ and not $d==3$

Moreover, this may be further simplified as follows:

Order when $i<8$ or $d=4$

In other words, order 63 inventory items when the inventory is less than 8 or when the demand forecast is equal to 4; otherwise, do not order any inventory items.

While the above solution does not explicitly account for constraints, those skilled in the art will appreciate the manner in which the MDP solution provided above can be extended to a CMDP scenario. In particular, the solution may become more complex as a result of constraints (e.g., budget constraints) that are imposed on the inventory management system. For constrained MDP problems, there are randomizations. Thus, the interval of [0,1] may be discretized to a predefined number of intervals or to exact values if there are not too many constraints (which is usually the case for performance and operational constraints). The variables may then be redefined to include this new discretized structure.

Notably, due to the high degree of complexity of CMDP models, the successful generation of logical, easily-interpretable representations of such models (as provided by the logically-represented policies described herein) is an unexpected result. This result is advantageous as it provides automated techniques for explaining the operation of control systems to users, thus enabling users to determine whether the output of the CMDP models make logical sense. This may be particularly advantageous in many real-world use-case scenarios, especially when constraints are essential. For example, since the chemical concentration of the effluent exiting a WWTP is closely monitored and controlled, it is essential for the operator(s) of the WWTP to understand whether the control system is controlling the chemical concentration in the most efficient manner possible.

Figure 2:
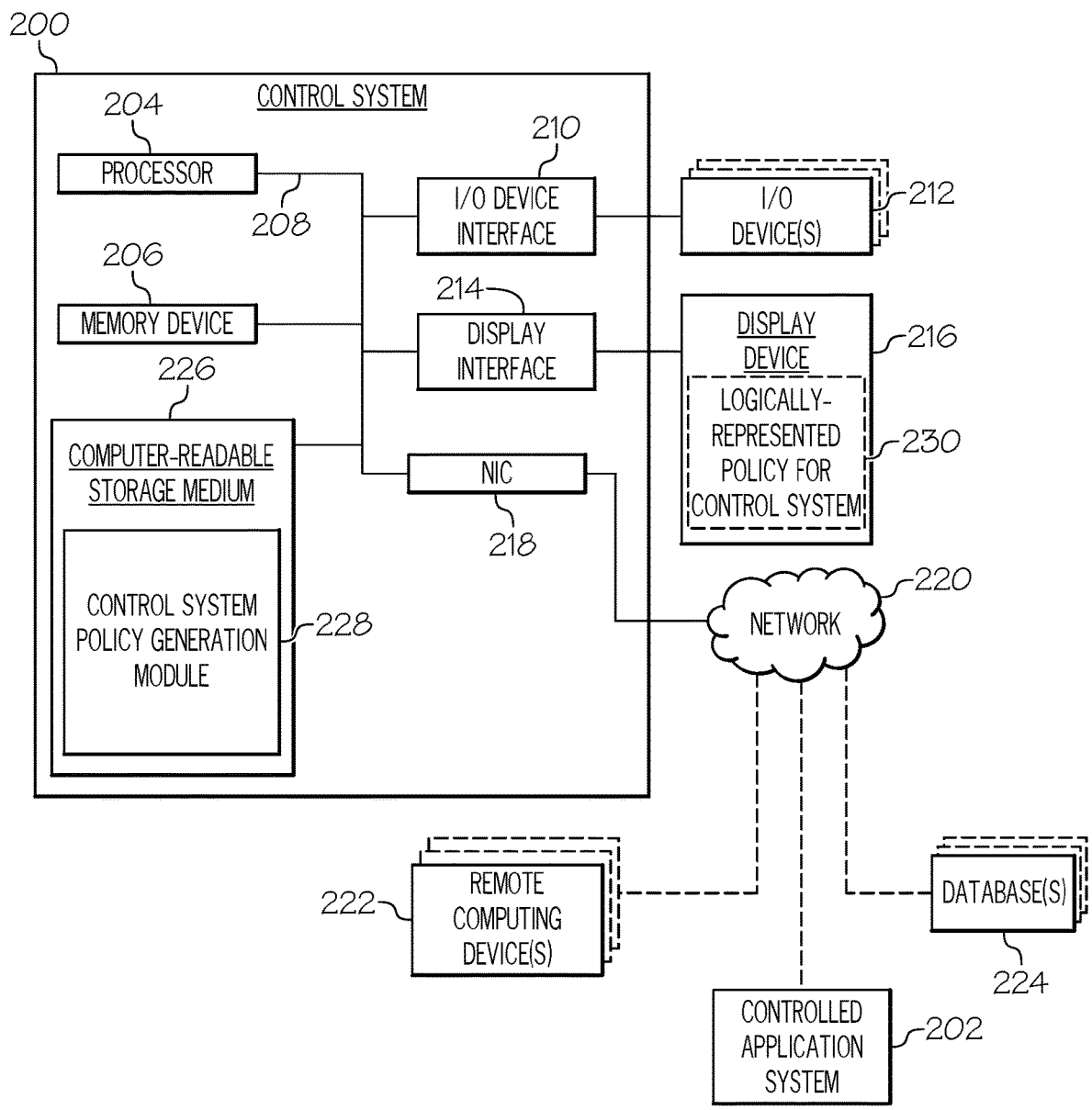
FIG. 2 is a simplified block diagram of an exemplary control system for which the control system policy generation techniques described herein may be implemented.

FIG. 2 is a simplified block diagram of an exemplary control system 200 for which the control system policy generation techniques described herein may be implemented. As described herein, the control system 200 is configured to direct the operation of a controlled application system 202. The control system 200 accomplishes this by performing one or more control actions that result in one or more desired system states, while meeting one or more constraints that are imposed on the operation of the controlled application system 202. As a non-limiting example, the controlled application system 202 may be an inventory management system, and the control system 200 may direct the operation of the inventory management system by ensuring that enough items are ordered to meet the forecasted demand, while staying within a specified budget for ordering items.

While the control system 200 is depicted as a single device in FIG. 1, those skilled in the art will appreciate that the control system 200 may include one or more servers, one or more general-purpose computing devices, one or more special-purpose computing devices, one or more virtual machines, and/or any other suitable type(s) of computing device(s) or application(s) distributed over multiple devices. As an example, the control system 200 may include a desktop computer, a laptop computer, a tablet computer, or a smartphone. Moreover, in some embodiments, the control system 200 is a cloud computing node.

In various embodiments, the control system 200 includes a processor 204 that is adapted to execute stored program instructions, such as program modules, as well as a memory device 206 that provides temporary memory space for the program instructions during execution. The processor 204 can include any suitable processing unit or device, such as, for example, a single-core processor, a single-core processor with software multithread execution capability; a multi-core processor, a multi-core processor with software multithread execution capability, a computing cluster, parallel platforms, parallel platforms with shared memory, or any number of other configurations. Moreover, the processor 204 can include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein. The memory device 206 can include volatile memory components, nonvolatile memory components, or both volatile and nonvolatile memory components. Nonvolatile memory components may include, for example, read only memory (ROM), programmable ROM (PROM), electrically programmable ROM (EPROM), electrically erasable ROM (EEROM), flash memory, or nonvolatile random-access memory (RAM) (e.g., ferroelectric RAM (FeRAM). Volatile memory components may include, for example, RAM, which can act as external cache memory. RAM is available in many forms, such as, for example, synchronous RAM (SRAM), dynamic RAM (DRAM), synchronous dynamic RAM (SDRAM), and the like.

In some embodiments, the control system 200 is practiced in a distributed cloud computing environment where tasks are performed by remote processing devices that are linked through a communications network. In a distributed cloud computing environment, program modules may be located in both local and remote computing devices.

The processor 204 is connected through a system interconnect 208 (e.g., PCI®, PCI-Express®, etc.) to an input/output (I/O) device interface 210 adapted to connect the control system 200 to one or more I/O devices 212. The I/O devices 212 may include, for example, a keyboard and a pointing device, where the pointing device may include a touchpad or a touchscreen, among others. The I/O devices 212 may include built-in components of the control system 200 and/or devices that are externally connected to the control system 200.

The processor 204 is also linked through the system interconnect 208 to a display interface 214 adapted to connect the control system 200 to one or more display devices 216. The display device 216 may include a display screen that is a built-in component of the control system 200. Additionally or alternatively, the display device 216 may include a computer monitor, television, or projector, among others, that is externally connected to the control system 200. In addition, a network interface controller (NIC) 218 is adapted to connect the control system 200 through the system interconnect 208 to the network 220. In some embodiments, the NIC 218 can transmit data using any suitable interface or protocol, such as the internet small computer system interface, among others. The network 220 may be a cellular network, a radio network, a wide area network (WAN), a local area network (LAN), or the Internet, among others. The network 220 may include associated copper transmission cables, optical transmission fibers, wireless transmission devices, routers, firewalls, switches, gateway computers, edge servers, and the like.

In various embodiments, the controlled application system 202 connects to the control system 200 through the network 220. As an example, the controlled application system 202 may include one or more remote computing devices with associated equipment, such as machinery, sensors, and the like, depending on the particular type of controlled application system.

One or more remote computing devices 222 may optionally connect to the control system 200 through the network 220. In addition, one or more databases 224 may optionally connect to the control system 200 through the network 220. In some embodiments, the one or more databases 224 store data relating to machine learning tasks. For example, the database(s) 224 may store data relating to one or more machine learning models (e.g., one or more CMDP models) that are used to determine control actions taken by the control system 200 with respect to the controlled application system 202. In such embodiments, the control system 200 may access or download at least a portion of such data during the control system policy generation techniques described herein.

The control system 200 also includes a computer-readable storage medium (or media) 226 that includes program instructions that may be executed by the processor 204 to perform various operations, such as the control system policy generation techniques described herein. The computer-readable storage medium 226 may be integral to the control system 200 or may be an external device that is connected to the control system 200 when in use. The computer-readable storage medium 226 may include, for example, an electronic storage device, a magnetic storage device, an optical storage device, an electromagnetic storage device, a semiconductor storage device, or any suitable combination of the foregoing. A non-exhaustive list of more specific examples of the computer-readable storage medium 226 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. Moreover, the term "computer-readable storage medium," as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In some embodiments, the NIC 218 receives program instructions from the network 220 and forwards the program instructions for storage in the computer-readable storage medium 226 within the control system 200.

Generally, the program instructions, including the program modules, may include routines, programs, objects, components, logic, data structures, and so on that perform particular tasks or implement particular abstract data types. For example, the program instructions may include assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++, or the like, and conventional procedural programming languages, such as the "C" programming language or similar programming languages. The program instructions may execute entirely on the control system 200, partly on the control system 200, as a stand-alone software package, partly on the control system 200 and partly on a remote computer or server connected to the control system 200 via the network 220, or entirely on such a remote computer or server. In some embodiments, electronic circuitry including, for example, programmable logic circuitry, field-programmable gate arrays (FPGA), or programmable logic arrays (PLA) may execute the program instructions by utilizing state information of the program instructions to personalize the electronic circuitry, in order to perform aspects of the control system policy generation techniques described herein.

According to embodiments described herein, the computer-readable storage medium 226 includes one or more program modules (and/or sub-modules) for performing the control system policy generation techniques described herein. Specifically, the computer-readable storage medium 226 includes a control system policy generation module 228 for generating a logically-represented policy for the control system, as described herein. The manner in which this module may be executed to perform the control system policy generation techniques described herein is explained further with respect to FIG. 1, for example.

Furthermore, in various embodiments, the resulting logically-represented policy 230 for the control system is displayed via the display device 216 to enable the operator(s) to oversee the operation of the controlled application system 202. As described herein, the logically-represented policy 230 may be any suitable logical, easily-interpretable representation of the CMDP-based policy that is being implemented by the control system 200. Moreover, the logically-represented policy 230 may be presented in any suitable form(s), such as, for example, in graphical form, flowchart form, pie chart form, tabular form, and/or textual form, depending on the details of the particular implementation.

It is to be understood that the block diagram of FIG. 2 is not intended to indicate that the control system 200 is to include all of the components shown in FIG. 2. Rather, the control system 200 can include fewer or additional components not illustrated in FIG. 2 (e.g., additional processors, additional memory components, embedded controllers, additional modules, additional network interfaces, etc.). Furthermore, any of the functionalities relating to the control system policy generation techniques described herein are partially, or entirely, implemented in hardware and/or in the processor 204. For example, such functionalities may be implemented with an ASIC, logic implemented in an embedded controller, and/or in logic implemented in the processor 204, among others. In some embodiments, the functionalities relating to the control system policy generation techniques described herein are implemented with logic, wherein the logic, as referred to herein, can include any suitable hardware (e.g., a processor, among others), software (e.g., an application, among others), firmware, or any suitable combination of hardware, software, and firmware.

Figure 3:
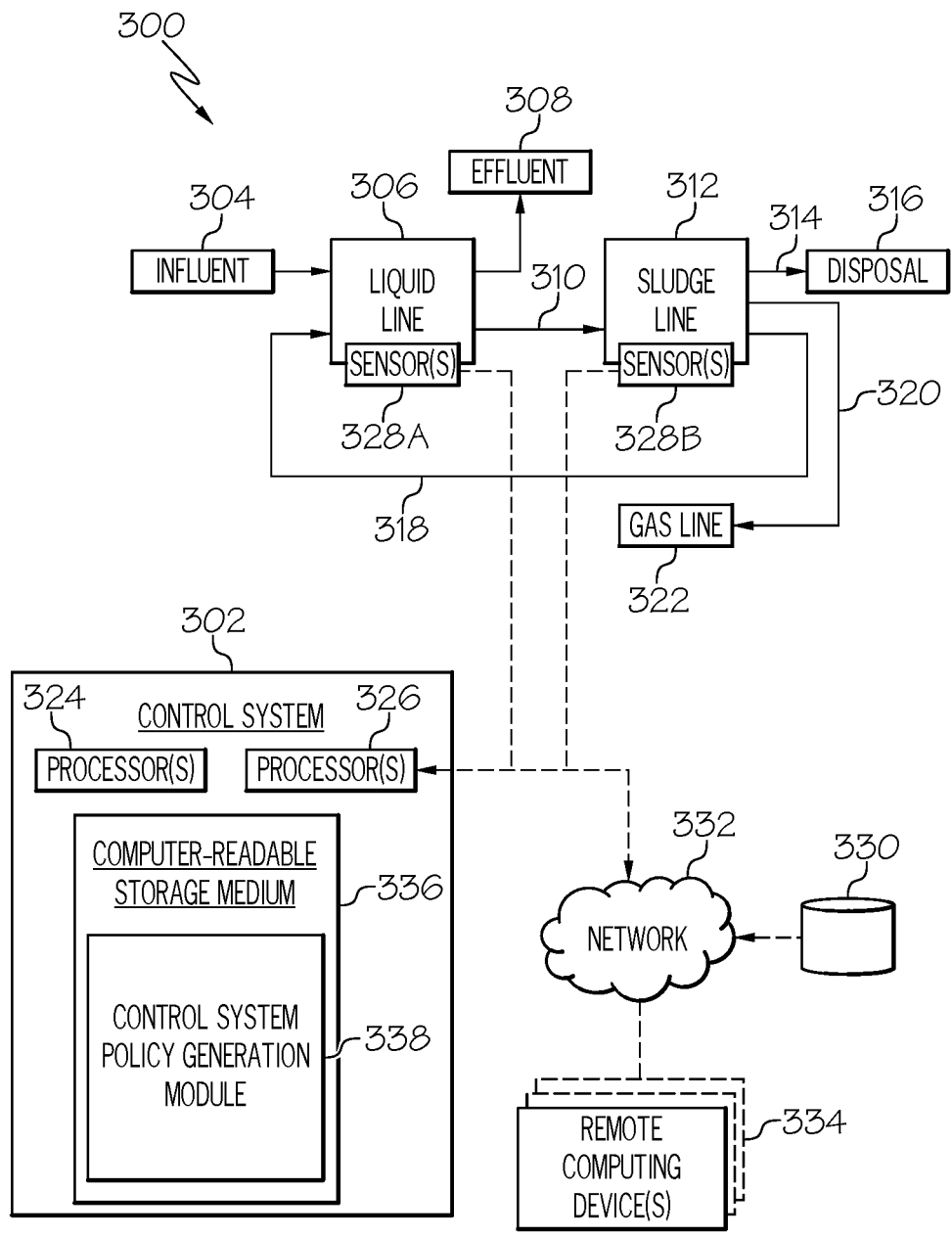
FIG. 3 is a simplified block diagram of an exemplary wastewater treatment plant (WWTP) including an exemplary control system for which the control system policy generation techniques described herein may be implemented.

FIG. 3 is a simplified block diagram of an exemplary WWTP 300 including an exemplary control system 302 for which the control system policy generation techniques described herein may be implemented. The WWTP 300 may be any suitable type of wastewater treatment unit, device, or system that is configured to treat incoming wastewater, which is referred to as influent 304. The influent 304 travels through a liquid line 306 within the WWTP 300, which may include any number of screens, pumps, reactors, settling tanks, separation devices, air blowers, and the like, for treating the influent 304 to a level that is set according to local regulations or protocols. The two main outputs of the liquid line 306 are a treated fluid, referred to as effluent 308, and a treated biosolid, referred to as sludge 310. The sludge 310 is then run through a sludge line 312, which may include any number of screens, pumps, reactors, settling tanks, separation devices, dehydration systems, aeration tanks, air blowers and the like, for treating the sludge 310. The resulting treated sludge 314, which may include a filter cake, for example, is then sent out for disposal 316, while a recycle effluent 318, which may include activated sludge for use in a reactor, for example, is recycled back into the liquid line 306. In addition, methane gas 320 that was separated from the sludge 310 in the sludge line 312 may be sent to a gas line 322, where it may be sold or used for various purposes.

In various embodiments, the control system 302 of the WWTP 300 is configured to control the functioning of the various devices and systems within the WWTP 300, such as the screen(s), pump(s), reactor(s), settling tank(s), separation device(s), air blower(s), dehydration system(s), aeration tank(s), and the like that are included within the liquid line 306 and/or the sludge line 312. In various embodiments, the control system 302 of the WWTP 300 consists of one or more servers, one or more general-purpose computing devices, one or more special-purpose computing devices, and/or one or more virtual machines, for example. Moreover, the control system 302 includes one or more processors 324, as well as an interface 326 for receiving readings from a number of sensors within the WWTP 300, such as one or more sensor(s) 328A connected to the liquid line 306 and one or more sensor(s) 328B connected to the sludge line 312. The sensor(s) 328A and 328B may be used to monitor various conditions relating to the WWTP 300. For example, the sensor(s) 328A and 328B may be used to monitor flow variables, such as a total-nitrogen-at-effluent flow variable and a total-phosphorus-at-effluent flow variable. The readings may be received directly from the sensor(s) or may be received via a proxy or an input device.

The interface 326 may also be used for acquiring data from one or more databases 330 associated with the WWTP 300 via a network 332, such as, for example, the Internet, a local area network (LAN), a wide area network (WAN), and/or a wireless network. The network 332 may include associated copper transmission cables, optical transmission fibers, wireless transmission devices, routers, firewalls, switches, gateway computers, edge servers, and the like. The data acquired from the databases 330 may include information relating to the operational requirements of the WWTP 300, as well as historical operational data for the WWTP 300 or other similar WWTPs, for example.

Furthermore, the interface 326 may be used to communicably couple the control system 302 with one or more remote computing devices 334 via the network 332. In various embodiments, the remote computing device(s) are operated by one or more operators of the WWTP 300. For example, the remote computing device(s) may include a mobile computing device or computer that the operator(s) use to oversee the operation of the WWTP 300 as directed by the control system 302.

The control system 302 also includes a computer-readable storage medium (or media) 336 that includes program instructions that may be executed by the processor(s) 324 to control the operation of the WWTP 300, as described further herein. The computer-readable storage medium 336 may be integral to the control system 302 or may be an external device that is connected to the control system 302 when in use. The computer-readable storage medium 336 may include, for example, an electronic storage device, a magnetic storage device, an optical storage device, an electromagnetic storage device, a semiconductor storage device, or any suitable combination of the foregoing. A non-exhaustive list of more specific examples of the computer-readable storage medium 336 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. Moreover, the term "computer-readable storage medium," as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In some embodiments, the interface 326 includes a network adapter card or network interface that receives program instructions from the network 332 and forwards the program instructions for storage in the computer-readable storage medium 336 within the control system 302.

The program instructions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The program instructions may execute entirely on the control system 302, partly on the control system 302, as a stand-alone software package, partly on the control system 302 and partly on a remote computer or server connected to the control system 302 via the network 332, or entirely on such a remote computer or server. In some embodiments, electronic circuitry including, for example, programmable logic circuitry, field-programmable gate arrays (FPGA), or programmable logic arrays (PLA) may execute the program instructions by utilizing state information of the program instructions to personalize the electronic circuitry, in order to perform aspects of the techniques described herein.

In operation, the properties of the effluent 308 and the treated sludge 314 exiting the WWTP 300 must comply with regulatory constraints that are specific to the location of the WWTP 300. Such constraints may include, for example, limits on the total nitrogen concentration and the total phosphorus concentration of the effluent 308 over specific time periods. An example of such a constraint is an upper limitation of 15 milligrams per liter (mg/L) for the monthly (or daily) average total nitrogen concentration in the effluent 308. To treat the effluent 308 and the treated sludge 314 to such an extent, multiple steps are carried out within the liquid line 306 and the sludge line 312. For example, the liquid line 306 may include various different types of equipment for treating the influent 304 via biological-physical and/or chemical sub-processes, as well as equipment for treating the influent 304 via any number of iterative sub-processes, such that the same influent portion visits some of the subprocesses multiple times.

To comply with such constraints, the control system 302 may be used to control various control action variables and system state variables relating to the WWTP 300. As used herein, the term "control action" refers to a possible action taken by a control system to control the operation of a controlled application system, while the term "system state" refers to a possible state of the controlled application system after the control system has taken one or more control actions. Examples of system state variables include the following: (1) operating at an influent flow rate (in cubic meters per hour ($m^3$/hr)) of low, medium, or high; (2) operating with one or more feedback or recycle loops set to an on or off setting; (3) operating with the upper limit on the total nitrogen concentration (in mg/L) and/or the total phosphorus concentration (in mg/L) of the effluent 308 set to low, medium, or high; (4) operating with a time period relating to the electricity cost set to an expensive, medium, or cheap setting; and (5) operating with a total operational cost set to low, medium, or high. Examples of control action variables include the following: (1) increasing or decreasing the speed of one or more air blowers within the WWTP 300; (2) increasing or decreasing the amount of chemicals being added to the liquid line 306 and/or the sludge line 312 within the WWTP 300; (3) increasing or decreasing the pumping rate (in $m^3$/hr) for one or more pumps within the WWTP 300; and (4) controlling feedback equipment within the WWTP 300, such as the feedback equipment that is used to send the recycle effluent 318 back into the liquid line 306.

As a result of this complexity, WWTPs typically have high operating costs, and it may be difficult for the operator(s) to determine the most efficient manner in which to operate such WWTPs. Accordingly, modern WWTPs are increasingly being designed to operate using machine-learning-enabled control systems. Therefore, according to embodiments described herein, the control system 302 is configured to automatically (or semi-automatically) operate the WWTP 300 using machine learning techniques. Specifically, the control system 302 utilizes a CMDP-based policy to determine appropriate control actions that will result in desired system states, while meeting the constraints imposed on the WWTP 300. However, as described herein, the complexity of such CMDP-based policies makes it difficult for the operator(s) of the WWTP 300 to make informed decisions regarding the operation of the WWTP 300. Therefore, according to embodiments described herein, the computer-readable storage medium 336 of the control system 302 includes a control system policy generation module 338 for generating a logically-represented policy for the control system. The logically-represented policy may then be used by the operator(s) of the control system to enable further optimization of the WWTP 300.

It is to be understood that the block diagram of FIG. 3 is not intended to indicate that the WWTP 300 (or the control system 302 within the WWTP 300) is to include all of the components shown in FIG. 3. Rather, the WWTP 300 (and/or the control system 302) may include any number of additional or alternative components not shown in FIG. 3. For example, the computer-readable storage medium 336 of the control system 302 may include any number of additional modules for controlling and/or optimizing the operation of the WWTP 300. In addition, the control system 302 may include and/or be connected to a simulation system that provides simulated data relating to the operation of the WWTP 300. In some embodiments, the control system 302 may use a combination of simulated data and data acquired from the sensors 328A and 328B to optimize the operation of the WWTP 300. Furthermore, those skilled in the art that a simplified version of controlled system 302 is shown in FIG. 3. In operation, the control system 302 is likely to include a number of additional components, such as, for example, the components described with respect to the exemplary control system 200 of FIG. 2.

The present techniques may be and/or include a system, a method, and/or a computer program product at any possible technical detail level of integration. As described herein, the computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically-encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present techniques may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable data processing apparatus, or other device to produce a computer-implemented process or method, such that the instructions which execute on the computer, other programmable data processing apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present techniques. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

Figure 4:
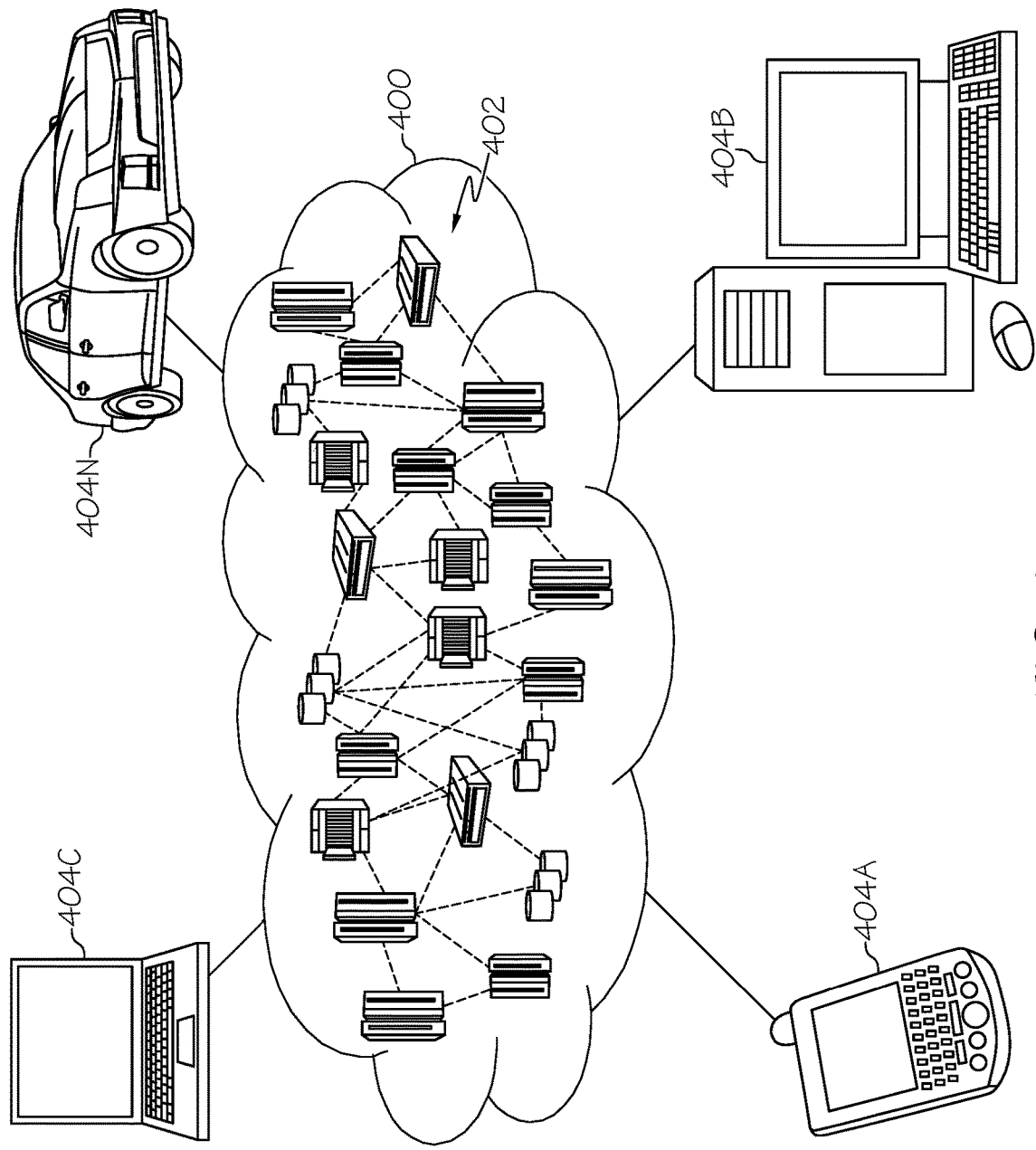
FIG. 4 is a schematic view of an exemplary cloud computing environment that can be used to implement the control system policy generation techniques described herein.
Figure 5:
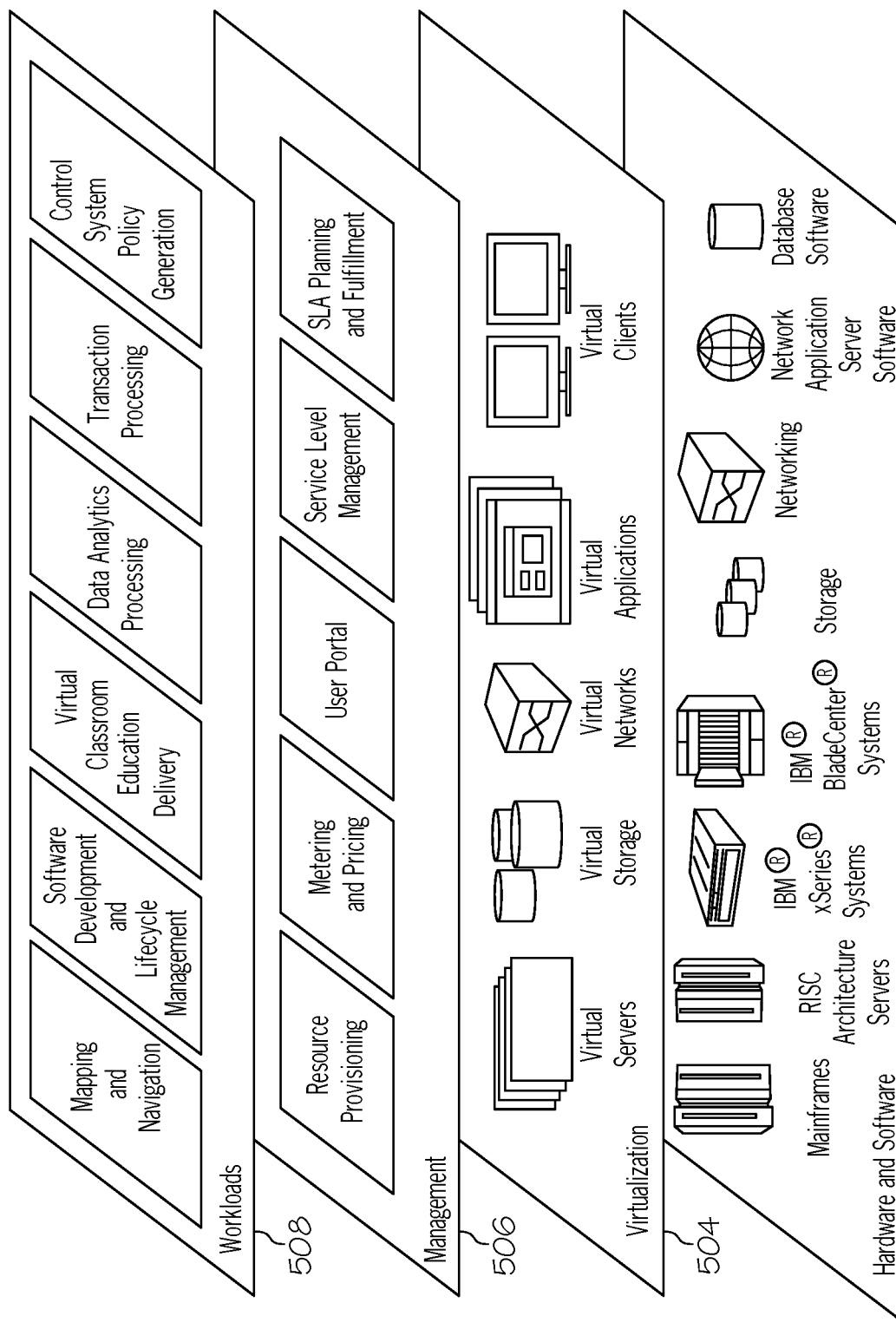
FIG. 5 is a simplified schematic view of exemplary functional abstraction layers provided by the cloud computing environment shown in FIG. 4 according to embodiments described herein.

In some scenarios, the control system policy generation techniques described herein may be implemented in a cloud computing environment, as described in more detail with respect to FIGS. 4 and 5. It is understood in advance that although this disclosure may include a description of cloud computing, implementation of the techniques described herein is not limited to a cloud computing environment. Rather, embodiments of the present techniques are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing units, memory, storage devices, applications, virtual machines, and services) that can be rapidly provisioned and released with minimal management effort or interaction with a provider of the service. This cloud model may include at least five characteristics, at least three service models, and at least four deployment models.

The at least five characteristics are as follows:

(1) On-demand self-service: A cloud consumer can unilaterally provision computing capabilities, such as server time and network storage, as needed automatically without requiring human interaction with the service's provider.

(2) Broad network access: Capabilities are available over a network and accessed through standard mechanisms that promote use by heterogeneous thin or thick client platforms (e.g., mobile phones, laptops, and PDAs).

(3) Resource pooling: The provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

(4) Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

(5) Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The at least three service models are as follows:

(1) Software as a Service (SaaS): The capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

(2) Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

(3) Infrastructure as a Service (IaaS): The capability provided to the consumer is to provision processing, storage, networks, and other fundamental computing resources, where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The at least four deployment models are as follows:

(1) Private cloud: The cloud infrastructure is operated solely for an organization. It may be managed by the organization or a third party and may exist on-premises or off-premises.

(2) Community cloud: The cloud infrastructure is shared by several organizations and supports a specific community that has shared concerns (e.g., mission, security requirements, policy, and compliance considerations). It may be managed by the organizations or a third party and may exist on-premises or off-premises.

(3) Public cloud: The cloud infrastructure is made available to the general public or a large industry group and is owned by an organization selling cloud services.

(4) Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure including a network of interconnected nodes.

FIG. 4 is a schematic view of an exemplary cloud computing environment that can be used to implement the control system policy generation techniques described herein. As shown, the exemplary cloud computing environment 400 includes one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. The cloud computing nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that the cloud computing nodes 402 and cloud computing environment 400 can communicate with any type of computerized device over any type of network and/or network addressable connection (e.g., using a web browser).

FIG. 5 is a simplified schematic view of exemplary functional abstraction layers provided by the cloud computing environment shown in FIG. 4 according to embodiments described herein. It should be understood in advance that the components, layers, and functions shown in FIG. 5 are intended to be illustrative only and embodiments of the present techniques are not limited thereto. As depicted, the following layers and corresponding functions are provided.

Hardware and software layer 502 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 504 provides an abstraction layer from which the following examples of virtual entities may be provided: virtual servers; virtual storage; virtual networks, including virtual private networks; virtual applications and operating systems; and virtual clients. In one example, management layer 506 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 508 provides examples of functionality for which the cloud computing environment may be utilized. Examples of workloads and functions which may be provided from this layer include the following: mapping and navigation; software development and lifecycle management; virtual classroom education delivery; data analytics processing; transaction processing; and executing the control system policy generation techniques described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a logically-represented policy for a control system, wherein the control system directs an operation of a controlled application system that is subject to a constraint, and wherein the computer-implemented method comprises:
    receiving, at the control system, data corresponding to control action variables and system state variables relating to the controlled application system, data corresponding to a cost or a reward, and data corresponding to a cost of the constraint;
    automatically training, via a processor of the control system, a constrained Markov decision process (CMDP) model for the operation of the controlled application system based, at least in part, on the received data, wherein the CMDP model is formulated using dual linear programming, and wherein the CMDP model comprises a policy corresponding to occupation measures that are decision variables of the dual linear programming formulation;
    automatically generating, via the processor, a logically-represented policy for the control system based on the policy of the CMDP model, wherein the logically-represented policy is provided in a logical form; and
    operating the control system based on the CMDP model.

2. The computer-implemented method of claim 1, comprising automatically generating, via the processor, a further logically-simplified version of the generated logically-represented policy for the control system, wherein the further logically-simplified version is designed to be easily interpreted by a user.

3. The computer-implemented method of claim 1, further comprising displaying, via a display device of the control system, the logically-represented policy for the control system.

4. The computer-implemented method of claim 3, further comprising modifying, via the control system, the operation of the controlled application system based on a user input received subsequent to the displaying of the logically-represented policy for the control system.

5. The computer-implemented method of claim 1, wherein the logical form is at least one of a disjunctive normal form (DNF) or a conjunctive normal form (CNF).

6. The computer-implemented method of claim 1, comprising automatically generating the logically-represented policy for the control system using an automatic solver.

7. The computer-implemented method of claim 6, wherein the automatic solver utilizes a Quine-McCluskey algorithm.

8. The computer-implemented method of claim 1, wherein the controlled application system comprises an inventory management system.

9. The computer-implemented method of claim 1, wherein the controlled application system comprises a wastewater treatment plant (WWTP).

10. A control system that directs an operation of a controlled application system that is subject to a constraint, wherein the control system comprises:
an interface for receiving data corresponding to control action variables and system state variables relating to the controlled application system, data corresponding to a cost or a reward, and data corresponding to a cost of the constraint;
a processor; and
a computer-readable storage medium storing program instructions that direct the processor to:
automatically train a constrained Markov decision process (CMDP) model for the operation of the controlled application system based, at least in part, on the received data, wherein the CMDP model is formulated using dual linear programming, and wherein the CMDP model comprises a policy corresponding to occupation measures that are decision variables of the dual linear programming formulation;
automatically generate a logically-represented policy for the control system based on the policy of the CMDP model, wherein the logically-represented policy is provided in a logical form; and
operate the control system based on the CMDP model.

11. The control system of claim 10, wherein the computer-readable storage medium stores program instructions that direct the processor to automatically generate a further logically-simplified version of the generated logically-represented policy for the control system.

12. The control system of claim 10, wherein the control system further comprises a display device, and wherein the computer-readable storage medium stores program instructions that direct the processor to display, via the display device, the logically-represented policy for the control system.

13. The control system of claim 12, wherein the computer-readable storage medium stores program instructions that direct the processor to modify the operation of the controlled application system based on a user input received subsequent to the displaying of the logically-represented policy for the control system.

14. The control system of claim 10, wherein the logical form is at least one of a disjunctive normal form (DNF) or a conjunctive normal form (CNF).

15. The control system of claim 10, wherein the computer-readable storage medium stores program instructions that direct the processor to automatically generate the logically-represented policy for the control system using an automatic solver.

16. The control system of claim 15, wherein the automatic solver utilizes a Quine-McCluskey algorithm.

17. A computer program product for generating a logically-represented policy for a control system, wherein the control system directs an operation of a controlled application system that is subject to a constraint, wherein the computer program product comprises a computer-readable storage medium having program instructions embodied therewith, wherein the computer-readable storage medium is not a transitory signal per se, and wherein the program instructions are executable by a processor to cause the processor to:
receive data corresponding to control action variables and system state variables relating to the controlled application system, data corresponding to a cost or a reward, and data corresponding to a cost of the constraint;
automatically train a constrained Markov decision process (CMDP) model for the operation of the controlled application system based, at least in part, on the received data, wherein the CMDP model is formulated using dual linear programming, and wherein the CMDP model comprises a policy corresponding to occupation measures that are decision variables of the dual linear programming formulation; and
automatically generate a logically-represented policy for the control system based on the policy of the CMDP model, wherein the logically-represented policy is provided in a logical form; and
operate the control system based on the CMDP model.

18. The computer program product of claim 17, wherein the program instructions are executable by the processor to cause the processor to automatically generate a further logically-simplified version of the generated logically-represented policy for the control system.

19. The computer program product of claim 17, wherein the program instructions are further executable by the processor to cause the processor to display, via a display device, the logically-represented policy for the control system.

20. The computer program product of claim 19, wherein the program instructions are further executable by the processor to cause the processor to modify the operation of the controlled application system based on a user input received subsequent to the displaying of the logically-represented policy for the control system.

* * * * *